Figure 1:
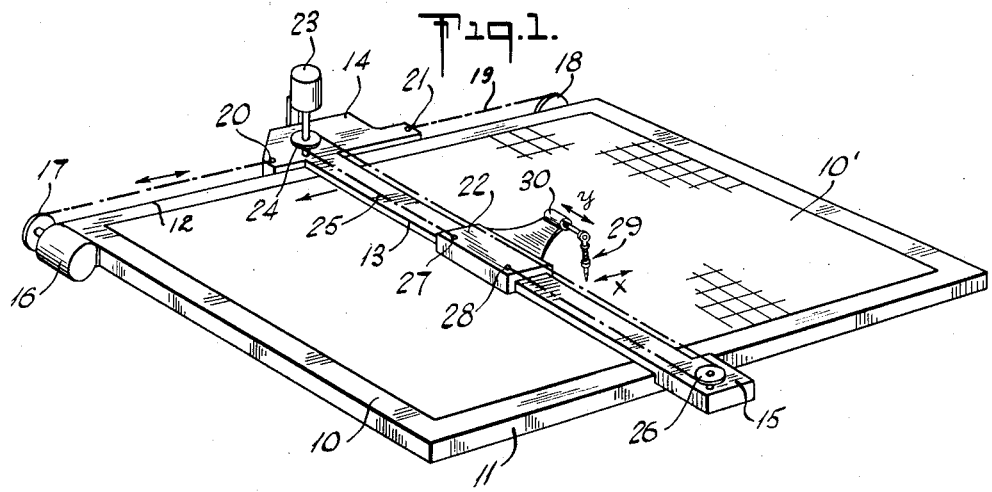

July 5, 1960 S. GODET 2,943,905
AUTOMATIC PLOTTING APPARATUS AND METHOD OF OPERATION
Filed Dec. 29, 1955

INVENTOR
SIDNEY GODET
BY
Burgess, Ryan, & Hicks
ATTORNEYS

United States Patent Office 2,943,905
Patented July 5, 1960

2,943,905

AUTOMATIC PLOTTING APPARATUS AND METHOD OF OPERATION

Sidney Godet, Great Neck, N.Y., assignor to Reeves Instrument Corporation, New York, N.Y., a corporation of New York Filed Dec. 29, 1955, Ser. No. 556,349

14 Claims. (Cl. 346—8)

This invention relates to plotting equipment for graphically displaying the relationship between variable quantities and more specifically to novel and improved servo-controlled positioning apparatus that will provide an increased frequency response and more faithful reproduction of the variations of the quantities being plotted.

One object of the invention resides in the provision of improved plotting apparatus characterized by increased frequency response, simplicity and dependability, enabling among other things the graphical presentation of the relationship of variable quantities on relatively large scale without sacrificing accuracy.

Another object of the invention is a novel and improved method of plotting variable quantities to provide an accurate graphical presentation of the relationship of said quantities one to the other.

Still another object of the invention resides in the provision of a plotting board and an associated electronic control for plotting two variable quantities whereby the effective mass of the plotting element can be materially reduced with a resultant improvement in the accuracy of the graphical presentation.

Yet another object of the invention is the provision of an improved positional control system for more accurately positioning an object in response to an applied positioning voltage.

The above and other objects and advantages of the invention will become more apparent from the following description and accompanying drawings forming part of this application.

Figure 2:
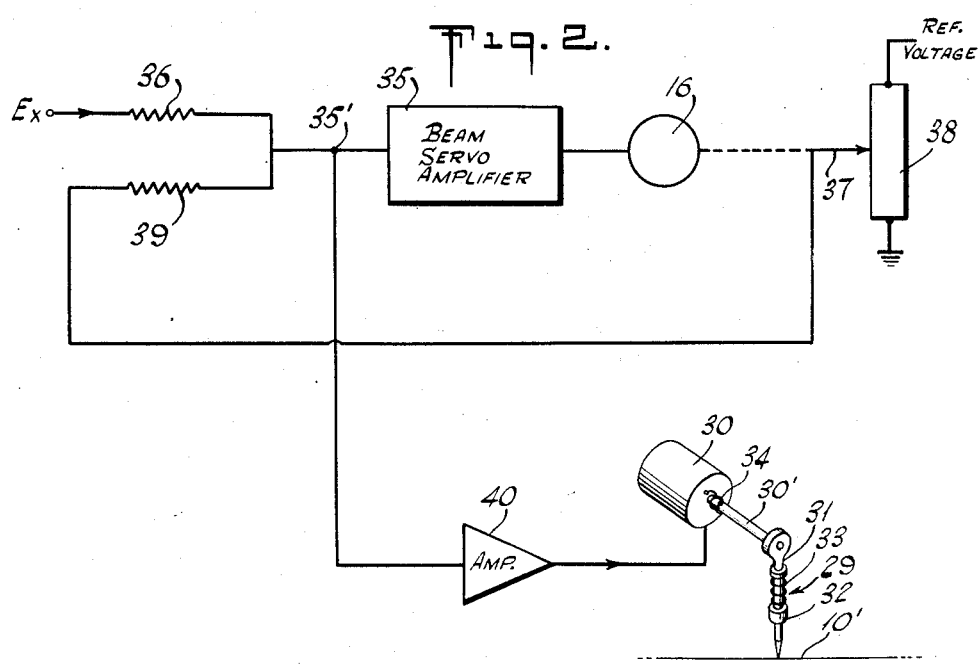

In the drawings:

Fig. 1 is a perspective view of a plotting board in accordance with the invention; and Fig. 2 is a block diagram of certain electrical and electromechanical elements for the operation of the plotting board of Fig. 1.

Plotting boards for graphically presenting the relationship between at least two quantities employ means for effecting universal movement of a pen or other writing instrument and a board for supporting paper on which the pen rides to record movement of the pen over the surface of the board. Inasmuch as rigidity of the pen support is essential, the plotting board is provided with a transverse beam movable lengthwise thereof and held at all times at 90° with the longitudinal or X axis of the board. For movement of the pen transversely of the board and along the Y axis a carriage is slidably mounted on the beam. The pen is supported by the carriage and thus may be moved over the board with its path being determined by the motion imparted to both the beam and the carriage.

With the plotting board structure as outlined above, the beam must span the board and in addition support the carriage. The beam therefore must be large enough to provide a high degree of rigidity and must include means for accurately guiding it lengthwise of the board. As a result, the weight or mass of the beam is high and this seriously limits the rapidity with which it may be moved. The carriage on the other hand merely supports the pen so that its weight is normally small. Thus, the carriage can respond to changes of much higher frequency than the beam.

It has been found that the frequency response of the plotting board and particularly the response along the longitudinal or X axis can be materially increased by providing for movement of the pen itself about a central position and along the X axis relative to the carriage and the beam. By coordinating the pen and beam movements so that upon movement of the pen in one direction in response to a rapid signal, the beam will follow the motion of the pen and tend to assume a position wherein the pen is centralized relative to the beam. In certain cases it may also be desirable to utilize the invention to improve the accuracy or frequency response of the transverse motion of the pen, though the carriage is usually light enough to provide a sufficiently high frequency response for many applications.

Referring now to the drawings and more specifically to Fig. 1, the plotting board assembly includes a rectangular board 10 of wood, metal or other suitable material. The longitudinal edges 11 and 12 of the board 10 are preferably provided with metallic or other hardened surfaces or tracks for supporting and guiding the transverse beam 13 with its axis in fixed alignment with the board 10.

In order to maintain the beam 13 in alignment with the board 10, the end 14 of the beam is made relatively wide and carries spaced wheels or other suitable means supporting the beam for relatively free, unimpeded movement lengthwise of the board. The other end 15 of the beam is also preferably provided with supporting devices offering little resistance to movement of the beam and cooperates with the support 14 to insure accurate alignment of the beam and board at all times.

Translation of the beam 13 lengthwise of the board 10 is accomplished by means of a suitable electric motor 16 carried by the board 10 or a suitable supporting frame therefor. The motor is provided with a drive pulley 17 positioned at one end of the board 10 while the other end of the board is provided with an idler pulley 18. The pulleys 17 and 18 are coupled with a flexible belt 19 secured at its ends to the beam aligning means 14 at 20 and 21. With this arrangement, rotation of motor 16 in one direction will move the beam in one direction over the surface of the board 10 while reversal of motion of the motor will reverse the motion of the beam. While the illustrated embodiment of the invention shows the drive pulley 17 attached directly to the motor 16, it is understood that any suitable speed modifying means may be interposed between the motor and pulley.

Motion transversely of the board 10 is attained by means of a carriage 22 slidably mounted on and carried by the beam 13. The carriage is driven relative to the beam 13 by means of a motor 23, supported by the beam aligning means 14, through a pulley and belt arrangement including a drive pulley 24 on the motor, a belt 25, and an idler pulley 26. The belt 25 in the instant embodiment of the invention is connected to the carriage at points 27 and 28 and the carriage may be provided with means for maintaining predetermined tension on the belt.

While the apparatus described thus far provides for both longitudinal as well as lateral movement of the pen 29, the weight or mass of the beam 13 including the end supports 14 and 15 and the carriage and drive assembly severely limits the frequency response of the device along the X or longitudinal axis. This limitation in frequency response of the beam 13 is overcome in the illustrated embodiment of the invention by providing for auxiliary motion for the pen 29 along the X or longitudinal axis. For this purpose the pen 29 is mounted on the shaft 30' of a torque motor 30 or other suitable device for moving the pen independently of the beam, which in turn is secured to the carriage 22. The operation of the torque motor 30 is coordinated with the X-axis drive motor 16 so that the motor 30 will operate in response to an error signal constituting the difference between a signal applied to motor 16 and a reference voltage having a magnitude determined by the instantaneous position of beam 13. The structure and operation of the pen 29 and pen drive motor 30 will be more clearly understood from Fig. 2 now to be described.

As will be observed in Fig. 2, the pen 29 is moved through an arc since it is actuated directly by the shaft 30' of motor 30. In order to maintain the nib of the pen in contact with the writing surface 10' at all times, the pen body is preferably formed of at least two telescopic elements 31 and 32 that are urged apart by a spring 33. The torque motor 30 carrying the pen 29 may be of the permanent magnet type and provided with a spring 34 for maintaining the shaft 30' in a predetermined centered position in the absence of an actuating signal. The application of an error signal to the motor 30 will thus move the shaft in a direction and to a degree determined by the polarity and magnitude of the signal.

The generation of the error signal is developed by the electrical components shown in Fig. 2 which function to coordinate the movement of the pen 29 and beam 13 at all times. Assume that two voltages $E_x$ and $E_y$ are to be plotted on the board 10. The voltage $E_x$ is applied to the beam servo amplifier 35 through a series resistor 36. The output voltage from the amplifier is applied to the motor 16 that drives the beam 13 together with a movable contactor 37 on the reference voltage potentiometer 38. As the motor 16 turns to move the beam 13, it will also modify the voltage on contactor 37. The movable contactor is connected to the input of amplifier 35 through the resistor 39, and the motor will continue to move the beam in one direction or the other until the potential of point 35' at the input to amplifier 35 is zero; that is the voltage at contactor 37 exactly balances the input voltage $E_x$. The mechanical coupling between motor 16, beam 13, and contactor 37 of potentiometer 38 is arranged so that beam 13 may be moved from one edge of board 10 to the opposite edge without exceeding the range of adjustment of the contactor 37. The position of contactor 37 on potentiometer 38 is related to the position of beam 13 with respect to the plotting board 10. When the input voltage $E_x$ changes rapidly and motor 16 cannot follow the changes because of the inertia of beam 13, an error voltage is developed at point 35'. The error voltage is used to actuate the pen drive motor 30 and is connected thereto through the amplifier 40. Thus, a positive error voltage will drive the pen in one direction while a negative error voltage will drive it in the other direction.

The operation of the invention may be more clearly understood if the system is considered to be in a balanced condition at the moment that the input voltage $E_x$ suddenly changes at a rate faster than beam 13 and motor 16 can respond. This signal change produces an error signal at 35' which causes the pen drive motor to move the pen 29 in the direction the beam 13 is to travel. Since the pen and its driving motor 30 has very much less mass than the beam 13, its response to the error signal will be rapid. Thus, with small changes in the input voltage $E_x$ producing instantaneous error signals within the range of motion of the pen itself, the pen will move in one direction or the other to record accurately such changes. Simultaneously the beam 13 will always be moved in a direction to bring the pen 29 back to its central position, at which point the error signal is zero and the pen is centered by the spring 34. With large changes in the input voltage $E_x$ the pen 29 will be moved to one limit of its movement relative to the beam 13 and at the same time the beam will be driven in a direction to center the pen.

With the invention as described above the motion of the pen or other plotting means in at least one direction is attained by the coordinated control of two systems, one of relatively large mass and the other of relatively little mass. In this way large scale plots may be made by large lineal movement of the system having large mass while small high frequency motion is applied to the pen by the low mass system. This provides a highly improved and more faithful reproduction of variations in the quantity being plotted by means of the two coordinated drive systems.

Operation of the drive motor 23 for moving the carriage 22 along the Y-axis may be accomplished in any desired manner. For instance, a simplified servo system similar to that of Fig. 2 may be used in which case the signal $E_y$ would be applied in the same manner as the input voltage $E_x$ and the error signal connection at 35' to the auxiliary torque motor would not be utilized. If desired, however, a low mass drive system for movement of the pen along the Y-axis may be employed.

While only certain embodiments of the invention have been shown and described, it is apparent that changes, modifications and alterations may be made without departing from the true scope and spirit thereof.

I claim:

1. A positional control system for moving the position of first and second objects relative to each other comprising first positioning means coupled to said first object for moving the position of said first object relative to a fixed reference position in accordance with an applied positioning signal, positional feedback means coupled to said first object for producing a positional voltage representing the position of said first object relative to said fixed reference position, second positioning means coupled to said second object, and means coupling said applied positioning signal and said positional voltage to said second positioning means, said second positioning means being adapted for moving the position of said second object relative to said first object in accordance with the difference between said applied positioning signal and said positional voltage.

2. In a plotting apparatus which includes a plotting surface, the combination comprising a transverse beam movable lengthwise of the plotting surface, a carriage slideably mounted on said beam, positioning means coupled to said transverse beam for positioning said beam in accordance with an applied input signal, positional feedback means coupled to said transverse beam for producing a positional voltage representing the position of said beam, a writing implement, electromechanical means coupling said writing implement to said carriage, and means coupling said applied input signal and said positional voltage to said electromechanical means, said electromechanical means being adapted for moving the tip of said writing implement with respect to said plotting surface in accordance with the difference between said applied input signal and said positional voltage.

3. The plotting apparatus as defined in claim 2 wherein said electromechanical means comprises motor means attached to said carriage, said motor means including a shaft having its axis situated in a plane substantially parallel to said plotting surface, and wherein said writing implement is coupled to said shaft.

4. The plotting apparatus as defined in claim 3 wherein said writing implement is mounted for rotation about the axis of said shaft, and wherein said writing implement includes resilient means for effecting radial displacement of said implement with respect to the axis of said shaft.

5. In an automatic plotting apparatus for producing a graphical presentation of the relationship of two variable quantities on a plotting surface, the combination comprising a writing implement, at least two servo actuating devices for moving said implement longitudinally and transversely of the plotting surface in response to electrical signals representing the quantities to be plotted, at least one of said servo devices producing an error signal proportional to the distance said implement is to be moved in response to a change in magnitude of one of said quantities, and implement actuating means responsive to the magnitude of said error signal for moving said implement in the direction corresponding to said one quantity independently of the movement of said implement in response to the operation of said servo devices.

6. In a plotting apparatus having a plotting surface, the combination comprising a transverse beam spanning the plotting surface and being movable longitudinally thereof, a carriage slidably supported by said beam for movement transversely of said plotting surface, marking means supported by said carriage for universal movement over said plotting surface in response to displacement of said beam and carriage relative to said surface, beam propelling means including an electric motor, a potentiometer driven by said motor for developing a reference voltage related to the position of said beam relative to the plotting surface, an amplifier connected with said motor, means for applying a voltage representing a quantity to be plotted to the input of said amplifier, means coupling the positional feedback voltage from said potentiometer to the input of said amplifier to produce an error signal for operation of said electric motor, said apparatus further comprising driving means for said carriage, electromechanical means attached to said carriage for moving said marking means independently of said beam and carriage and longitudinally of the plotting surface, and means for applying said error signal to said electromechanical means.

7. In a plotting apparatus, the combination as defined in claim 6 wherein the said electromechanical means constitutes a torque motor whose shaft is movable in a direction and through an angle determined by the polarity and magnitude of said error signal.

8. A positional control system for positioning first and second movable objects, said second object being carried by said first object, comprising in combination, first electromechanical positioning means coupled to said first object for positioning said first object, means coupled to said first object for producing a positional feedback voltage representing the position of said first object, input means adapted for receiving an applied positioning voltage, a first amplifier coupled to said input means and to said positional feedback voltage means and responsive to the difference between said positional feedback voltage and said applied positioning voltage for energizing said first electromechanical positioning means, said first object being moved in accordance with said difference voltage, and second electromechanical positioning means coupling said second object to said first object for relative movement therebetween, said second electromechanical positioning means coupled to said input means and to said positional feedback voltage means for automatically positioning said second object relative to said first object according to the difference between said positional feedback voltage and said applied positioning voltage.

9. A positional control system comprising in combination, a first movable object whose position is to be controlled according to an applied positioning voltage, a first servo control system including an intercoupled amplifier and an electromechanical positioning means for positioning said first movable object, positional feedback means coupled to said first movable object for coupling a positional feedback voltage to the input of the amplifier of said first servo control system, said first servo control system being responsive to the difference between said applied positioning voltage and said positional feedback voltage for positioning said first object, a second object carried by said first object and being movable relative to said first object, a second servo control system including an intercoupled amplifier and an electromechanical positioning means coupled to said second movable object, and means coupling the difference voltage between said applied positioning voltage and said positional feedback voltage to the input of the amplifier of said second servo control system for positioning said second object relative to said first object.

10. An automatic positional control system comprising in combination, a first object movable along a first direction and whose position is to be controlled relative to a reference point, a second object movable along the same direction and whose position is to be controlled relative to said first object, a servo control system for varying the position of said first object according to an applied positioning voltage, said servo control system including a servomotor coupled to said first object for moving said object relative to said reference point, potentiometer means having a movable contact coupled to said servomotor, means adapted for coupling a reference voltage to said potentiometer means, said potentiometer means producing an output voltage whose magnitude corresponds to the position of said first object relative to said reference point, means responsive to the difference between said applied positioning voltage and the output voltage from said potentiometer means for energizing said servomotor, said servomotor simultaneously positioning said first object and said movable contact until the position of said first object relative to said reference point coincides with the position represented by said applied positioning voltage, electromechanical responsive means coupling said second object to said first object, means coupling the difference voltage between said applied positioning voltage and said potentiometer output voltage to said electromechanical responsive means for varying the position of said second object relative to the position of said first object in accordance with the magnitude of said difference voltage, said electromechanical means including means maintaining the position of said second object fixed with respect to a predetermined position on said first object when said difference voltage is zero, the mass of said second object being appreciably less than the mass of said first object.

11. The automatic positional control system as defined in claim 10 further comprising a plotting table situated adjacent said first object, said first object including a beam movable over the surface of said plotting table in a plane parallel to said plotting surface, and said second object including a writing implement for indicating the position of said second object relative to said reference point upon the surface of said plotting table.

12. A positional control system for moving first and second objects relative to each other; comprising in combination; a closed-loop servo control system including a servo amplifier, a positioning means coupled to the output of said servo amplifier and to said first object for positioning said first object, and a positional feedback means coupled to said first object for producing a voltage representing the position of said first object; said servo amplifier being responsive to the difference between said positional feedback voltage and an applied positioning voltage for actuating said positioning means to move said first object; and a second servo control system including a second positioning means coupled to said second object; and means coupling the difference voltage between said applied positioning voltage and said positional feedback voltage to said second servo control system for moving said second object relative to said first object.

13. An improved plotting system comprising in combination, means for supporting a plotting surface, an object supported for movement over said plotting surface, a first electromechanical positioning means coupled to said object for positioning said object over said plotting surface in accordance with an applied positioning voltage, means coupled to said object for producing a positional voltage representing the position of said object relative to said plotting surface, a writing implement movably attached to said object, second electromechanical positioning means coupled to said writing implement, and input means coupled to said positional voltage means and to said second electromechanical means, said input means being jointly responsive to said applied positioning voltage and said positional voltage for supplying a voltage to said second electromechanical positioning means varying according to the difference between said positioning and positional voltages, said second electromechanical positioning means positioning said writing implement relative to said object over said plotting surface in accordance with said difference voltage.

14. A plotting system comprising in combination, means for supporting a plotting surface, an object movable along a first direction over said plotting surface, a writing implement carried by said object and adapted for movement relative to said object along said first direction, first electromechanical means coupled to said object for positioning said object over said plotting surface, means coupled to said object for producing a positional feedback voltage representing the position of said object relative to said plotting surface, input means, said input means being coupled to said positional feedback means and being jointly responsive to said positional feedback voltage and to an applied input voltage for producing an output voltage varying according to the difference between said positional and positioning voltages, means coupling said difference voltage to said first electromechanical means, said first electromechanical means varying the position of said object over said plotting surface according to the value of said applied input positioning voltage, second electromechanical means coupled to said writing implement, and means coupling said difference voltage from said input means to said second electromechanical means for varying the position of said writing implement relative to said object in accordance with the value of said difference voltage.

References Cited in the file of this patent

UNITED STATES PATENTS

| | | |
|---|---|---|
| 2,530,516 | Finch | Nov. 21, 1950 |
| 2,686,099 | Bomberger et al. | Aug. 10, 1954 |
| 2,689,318 | Goertz et al. | Sept. 14, 1954 |
| 2,727,308 | Kuhn et al. | Dec. 20, 1955 |
| 2,751,169 | Kutzler | June 19, 1956 |
| 2,839,351 | Cutler | June 17, 1958 |

FOREIGN PATENTS

| | | |
|---|---|---|
| 1,112,421 | France | Nov. 16, 1955 |